US006213684B1

(12) United States Patent
Fowler et al.

(10) Patent No.: US 6,213,684 B1
(45) Date of Patent: Apr. 10, 2001

(54) TELESCOPING WEIR

(76) Inventors: Jack Fowler, 5000 Lowery Rd., Vicksburg, MS (US) 39180; Ronald G. Vann, 2612 Heston Rd., Virginia Beach, VA (US) 23451; Thomas D. Woodward, Jr., 4805 W. Norfolk Rd., Portsmouth, VA (US) 23703

( * ) Notice: Subject to any disclaimer, the term of this patent is extended or adjusted under 35 U.S.C. 154(b) by 0 days.

(21) Appl. No.: 09/178,503

(22) Filed: Oct. 26, 1998

(51) Int. Cl.[7] ....... E01F 5/00

(52) U.S. Cl. ....... 405/127; 405/87; 405/92; 405/104; 210/103; 210/97

(58) Field of Search ....... 405/127, 87, 92, 405/103, 104; 210/103, 104, 97

(56) References Cited

U.S. PATENT DOCUMENTS

| | | | | |
|---|---|---|---|---|
| 337,819 | | 3/1886 | Dill . | |
| 3,832,854 | | 9/1974 | Metts . | |
| 4,091,624 | | 5/1978 | Steinke . | |
| 4,352,591 | | 10/1982 | Thompson . | |
| 4,439,061 | | 3/1984 | Whipps . | |
| 4,832,527 | | 5/1989 | Bachmann . | |
| 4,867,872 | * | 9/1989 | Russell et al. | 210/104 |
| 5,255,999 | | 10/1993 | Perslow . | |
| 5,284,402 | * | 2/1994 | Del Villar | 405/127 |
| 5,993,649 | * | 11/1999 | Debusk et al. | 210/97 |

FOREIGN PATENT DOCUMENTS

| | | | | |
|---|---|---|---|---|
| 4212688 | * | 10/1993 | (DE) | 137/1 |
| 0165311 | * | 12/1980 | (JP) | 405/127 |
| 0025514 | * | 3/1981 | (JP) | 405/127 |
| 0048010 | * | 3/1982 | (JP) | 405/127 |
| 57066213 | * | 4/1982 | (JP) | 405/103 |
| 57205610 | * | 12/1982 | (JP) | 405/104 |
| 0135214 | * | 8/1983 | (JP) | 405/127 |
| 62206116 | * | 9/1987 | (JP) | 405/103 |
| 63255414 | * | 10/1988 | (JP) | 405/127 |
| 0297620 | * | 12/1988 | (JP) | 405/127 |
| 0036311 | * | 2/1991 | (JP) | 405/127 |
| 404185807 | * | 7/1992 | (JP) | 405/127 |
| 07012802 | * | 3/1999 | (JP) . | |

* cited by examiner

*Primary Examiner*—Eileen D. Lillis
*Assistant Examiner*—Jong-Suk Lee

(57) ABSTRACT

A telescoping weir for the controlled drainage of contaminated bodies of water, such as confined disposal facilities (CDF), which selectively releases only the relatively clean water while leaving behind a contaminated portion. The weir includes a foundation that is anchored to the bottom of the body of water and connected with a discharge pipe, a cylindrical telescoping portion connected with the discharge pipe and extending upwardly from the foundation and terminating adjacent to the surface of the body of water, and a set of mechanical jacks for selectively extending and retracting the upper end of the telescoping portion above and below the water surface in order to selectively drain a top layer of clean decant water therefrom.

4 Claims, 1 Drawing Sheet

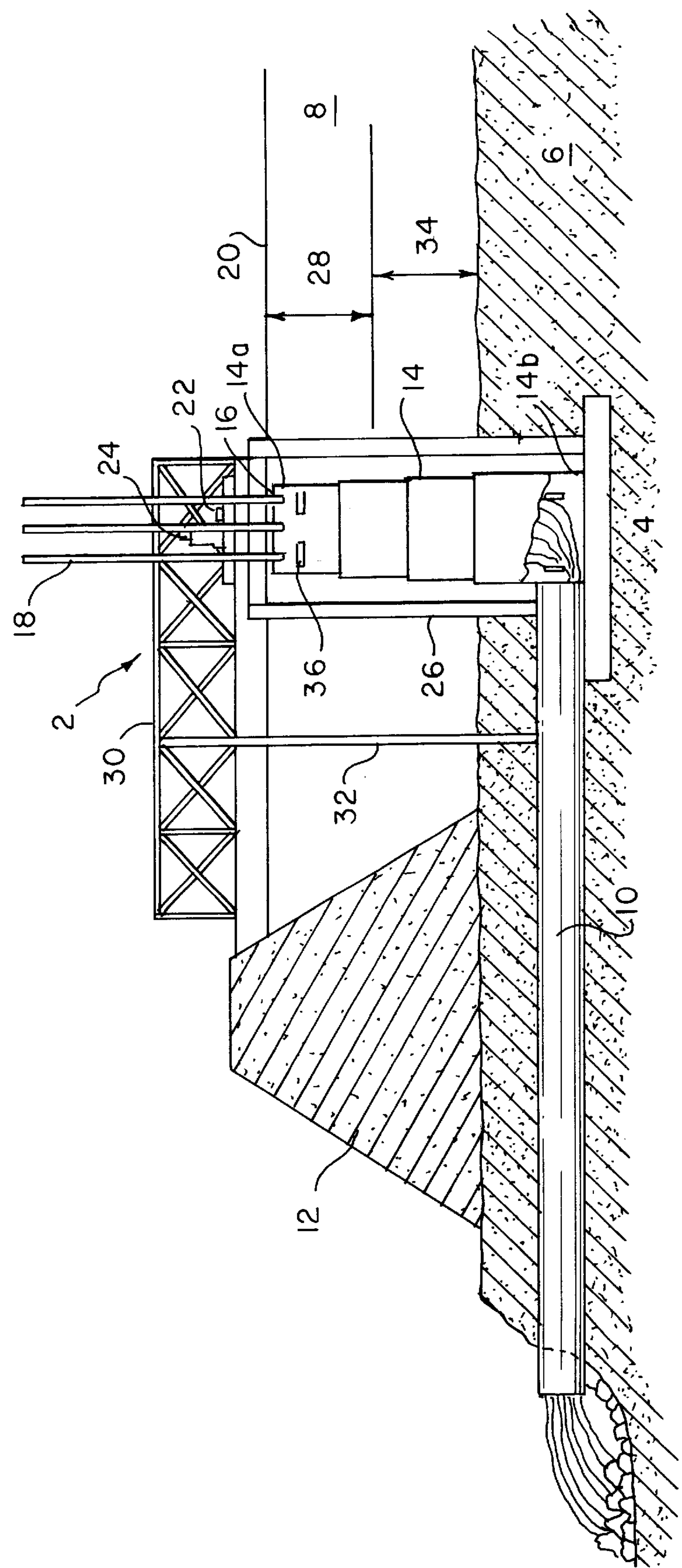
8
6
20
28
34
14a
22
16
24
14
14b
4
18
36
26
2
30
32
10
12

TELESCOPING WEIR

BACKGROUND OF THE INVENTION

The present invention relates to a telescoping weir having vertically adjustable concentrically nested cylinders capable of being raised or lowered to selectively drain layers of environmentally acceptable water from a body of contaminated water.

Regulating the release of clean water from dredged material containment areas or confined disposal facilities (CDF) through the use of a weir is necessary to ensure that acceptable water, absent unwanted sediment and silt, is returned to the environment. During dredging, contaminated water is constantly flowing into the CDF, making it necessary to continuously decant the relatively clean surface water while the sediment settles into lower portions of the CDF. The telescoping weir is useful to improve the environmental quality of water released from such a contaminated body of water.

BRIEF DESCRIPTION OF THE RELATED ART

Currently there are several techniques and devices used to regulate the release of water from dredged material containment areas.

Vertical weirs for controlling the level and drainage of bodies of water are not new in the art. U.S. Pat. No. 337,819 issued to Dill discloses a combined wasteway and drain for ponds including an upwardly projecting portion which has the same height as a bank of the body of water. This portion has an open top portion for draining away any water that exceeds its height to a location remote from the body of water, and therefore prevents the bank from being overflowed.

Many static weirs are adapted to receive boards or stop logs along an upper portion or weir crest to adjust the level of the weir crest to meet the current levels of water and sediment within the confined disposal facility (CDF). The disadvantage of using boards is that they are very difficult to install or remove at the right time to maintain the correct weir crest level during decanting. Thus, they are very labor intensive. This results in too much or too little water being released. These weirs almost always leak between the boards thus allowing material to escape and often creating an undesirable environmental condition. Also, the existing board weirs make a good habitat for snakes, spiders, and wasps while presenting the safety hazard of someone falling into the weir while changing the boards.

The present invention was developed in order to overcome these and other drawbacks by providing a telescoping weir in which the weir crest may be adjusted to the appropriate height relative to the surface of the water to decant clean water from a CDF.

SUMMARY OF THE INVENTION

Accordingly, a primary object of the present invention is to provide a telescoping weir having a foundation that is anchored to the bottom of a body of water and connected with a discharge pipe, a cylindrical telescoping portion that extends upwardly from the foundation and terminates adjacent to the surface of the body of water which is also connected with the discharge pipe, and a set of mechanical jacks for selectively extending and retracting the upper end of the telescoping portion above or below the water surface in order to drain a top layer of clean water therefrom.

It is another object of the invention to provide a telescoping weir having a frame that is interconnected between the foundation and the mechanical jacks for stabilizing the cylindrical telescoping portion from external forces.

Another object of the invention is to provide a telescoping weir having a sensor located thereon for measuring the environmental qualities of the surrounding water, such as effluent turbidity, temperature, pH, and biological oxygen demand. Based on the sensed conditions, the elevation of the weir crest is adjusted to permit more or less water to be released.

It is another object of the invention to provide an improved weir design and operation which improves the environmental quality while providing ease of use and operational safety.

It is another object of the invention to provide a telescoping weir that can be equipped with a remote readout and control capability that enables several weirs to be monitored and adjusted from a remote location.

It is a further object of the invention to provide a telescoping weir that is easily adaptable for use in other de-watering applications and water control including reservoirs, ponds, water treatment, waste water, mining waste, paper mill lagoons, chemical waste lagoons, and irrigation control.

BRIEF DESCRIPTION OF THE DRAWINGS

Other objects and advantages of the invention will become apparent from a study of the following specification when viewed in light of the accompanying drawing, in which:

FIG. 1 is a schematic view of a telescoping weir located within a body of water according to the invention.

DETAILED DESCRIPTION

Referring to FIG. 1, there is shown a telescoping weir 2 having a foundation 4 anchored to or within the bottom surface 6 of a body of water 8. Connected with the foundation 4 is a discharge pipe 10 for carrying environmentally acceptable water away to a location remote from the body of water. The discharge pipe may pass through an embankment 12 or dike wall behind which the water 8 is retained until it is ready to be released.

Connected with the foundation 4 and extending vertically upwardly therefrom are a plurality of interconnected concentrically arranged cylinders 14. The cylinders 14 are of a decreasing diameter and connected in sliding engagement so that the arrangement may be extended or retracted in a telescoping manner. Each of the connections between the cylinders is water tight.

The largest of the cylinders is connected with the foundation at the bottom portion **14*b* thereof An uppermost cylinder 14*a* of least diameter has an upper edge which defines the weir crest 16. The telescoping cylinders 14 are connected with the discharge pipe 10** to transfer water from the weir to the pipe.

The telescoping weir further includes a set of mechanical screw jacks 18 connected with the uppermost cylinder **14*a*. The jacks 18 are used to raise and lower the weir crest 16 above and below the water surface 20** to selectively permit the desired amount of water to be released.

The mechanical screw jacks 18 are manually or electrically operated. When electrically operated, an electric motor 22 raises and lowers the weir crest 16. The benefit of using an electric motor is the ease in which it may be remotely operated. A manual control device 24, such as a hand crank, may be employed and linked to the jacks 18.

A frame 26 is secured to the foundation 4 and extends rigidly upwardly where it is connected to the mechanical screw jacks 18. The frame 26 adds stability to the telescoping cylinders 14 and keeps it from swaying or collapsing under external loads. The frame 26 also helps the weir crest 16 maintain a constant elevation with respect to the water surface 20. This is important for the weir in order to remove only the clean upper layer of water 28.

A catwalk 30 is attached to the frame 26 so that a user may visually inspect the weir or make any manual adjustments via the control device 24 located on the frame 26. The catwalk 30 extends from the embankment 12 to the frame 26 and may include supports 32 as structurally required.

In operation, the telescoping weir 2 is installed within a confined disposal facility (CDF) in order to regulate the release of environmentally acceptable water. As dredged material enters into the body of water 8, it goes through three phases of de-watering: sedimentation, consolidation, and desiccation drying. As the contaminated water enters the CDF, heavier materials within the water tend to settle towards the bottom layers 34 leaving a cleaner upper layer 28 near the surface 20. Therefore, in order to maintain an acceptable effluent quality of water released from the CDF, only the upper layers 28 should be drained.

To accomplish this, the weir crest 16 is lowered slightly below the water surface 20. Water adjacent the weir crest 16 is then drained down through the cylinders 14 and through the discharge pipe 10. To stop the drainage of water, the weir crest 16 is elevated above the water surface 20. As is the case with the CDF, the level of water contained therein is constantly changing due to increased dredging, rainfall, or runoff. Accordingly, the upper layer 28 will vary greatly. The telescoping weir 2 is able to constantly match the weir crest 16 elevation to that of the upper surface 20 in order to maintain the optimum quality of the water that is released.

The telescoping weir may also be equipped with a variety of sensors 36 to measure qualities of the water, such as effluent turbidity, temperature, pH, and biological oxygen demand. The sensors 36 can be electrically connected with the electric motor 22 which drives the mechanical jacks 18. It is then possible to automatically control the placement of the weir crest 16, and therefore the water released, based on the measured qualities of the surrounding water.

While in accordance with the provisions of the Patent Statute the preferred forms and embodiments of the invention have been illustrated and described, it will be apparent to those of ordinary skill in the art that various changes and modifications may be made without deviating from the inventive concepts set forth above.

What is claimed is:

1. A telescoping weir for selectively draining clean water from a body of contaminated water within a confined disposal facility via a discharge pipe, comprising (a) a foundation anchored to the bottom of the confined disposal facility, said foundation being connected with the discharge pipe;

(b) cylindrical telescoping means connected with and extending upwardly from said foundation and terminating at an upper open end adjacent to the water surface for;

(c) sensor means connected with said cylindrical telescoping means adjacent to said upper open end for sensing various qualities of the contaminated water; and (d) means for extending and retracting said telescoping means to position the upper end thereof at positions above and just below the water surface in order to selectively drain a clean top layer of the contaminated water from the confined disposal facility without disturbing contaminated lower layers thereof and to transfer the clean water only from the water surface through said cylindrical telescoping means to the discharged pipe, said extending and retracting means further responding to an output from said sensor means to extend said telescoping means so that said upper open end is above the water surface to terminate drainage when the water quality is below a predetermined quality threshold.

2. Apparatus as defined in claim 1, and further comprising a frame connected between said foundation and said telescoping means for supporting said telescoping means within the body of water.

3. Apparatus as defined in claim 2, wherein said extending and retracting means comprises at least one mechanical screw jack connected with said telescoping means.

4. Apparatus as defined in claim 3, wherein said telescoping means comprises a plurality of interconnected concentrically arranged coaxial cylinders of progressively decreasing diameter, said jacks being connected with an uppermost cylinder of the least diameter.

* * * * *